United States Patent
Sheedy et al.

(10) Patent No.: US 9,624,138 B2
(45) Date of Patent: Apr. 18, 2017

(54) FORMATION OF VOIDS WITHIN COMPONENTS FORMED FROM POROUS SUBSTRATES

(71) Applicant: United Technologies Corporation, Hartford, CT (US)

(72) Inventors: Paul Sheedy, Bolton, CT (US); Wayde R. Schmidt, Pomfret Center, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/639,251

(22) Filed: Mar. 5, 2015

(65) Prior Publication Data

US 2015/0284297 A1  Oct. 8, 2015

Related U.S. Application Data

(60) Provisional application No. 61/976,521, filed on Apr. 8, 2014.

(51) Int. Cl.
| | |
|---|---|
| C04B 35/00 | (2006.01) |
| C04B 38/00 | (2006.01) |
| F01D 25/00 | (2006.01) |
| C04B 35/565 | (2006.01) |
| C04B 35/573 | (2006.01) |
| C04B 35/653 | (2006.01) |
| C04B 35/80 | (2006.01) |

(Continued)

(52) U.S. Cl.
CPC ........ *C04B 38/0087* (2013.01); *C04B 35/565* (2013.01); *C04B 35/573* (2013.01); *C04B 35/653* (2013.01); *C04B 35/806* (2013.01); *C04B 38/061* (2013.01); *F01D 5/182* (2013.01); *F01D 5/183* (2013.01); *F01D 5/282* (2013.01); *F01D 5/284* (2013.01); *F01D 25/005* (2013.01); *C04B 2235/3891* (2013.01); *C04B 2235/40* (2013.01); *C04B 2235/404* (2013.01); *C04B 2235/405* (2013.01); *C04B 2235/425* (2013.01); *C04B 2235/428* (2013.01); *C04B 2235/5216* (2013.01); *C04B 2235/5276* (2013.01); *C04B 2235/6028* (2013.01); *C04B 2235/614* (2013.01); *C04B 2235/616* (2013.01); *C04B 2235/80* (2013.01); *F05D 2230/40* (2013.01);

(Continued)

(58) Field of Classification Search
CPC ............................ C04B 35/565; C04B 35/573
USPC ............................................ 501/96.2, 87, 88
See application file for complete search history.

(56) References Cited

U.S. PATENT DOCUMENTS

| | | | |
|---|---|---|---|
| 3,725,015 A * | 4/1973 | Weaver .................. | C04B 35/524 264/29.1 |
| 4,814,029 A | 3/1989 | Butcher | |

(Continued)

OTHER PUBLICATIONS

European Search Report for European Application No. 15162133.1 mailed Aug. 10, 2015.

*Primary Examiner* — Noah Wiese
(74) *Attorney, Agent, or Firm* — Carlson, Gaskey & Olds, P.C.

(57) ABSTRACT

A method of creating a component comprises forming a substrate and depositing a template material within the substrate, such that there are a plurality of template member. The component is heated to a temperature above a melting point of the template material, such that the template material wicks into a porosity of the substrate and forms a component with voids. An average hydraulic diameter of the voids is less than 1 millimeter. A component formed by the method, and the component itself are also disclosed.

20 Claims, 4 Drawing Sheets

(51) Int. Cl.
    *C04B 38/06*     (2006.01)
    *F01D 5/18*     (2006.01)
    *F01D 5/28*     (2006.01)

(52) U.S. Cl.
    CPC ............. *F05D 2300/514* (2013.01); *F05D 2300/6033* (2013.01); *Y02T 50/672* (2013.01); *Y02T 50/676* (2013.01)

(56) References Cited

U.S. PATENT DOCUMENTS

| | | | |
|---|---|---|---|
| 5,196,271 A | 3/1993 | White et al. | |
| 5,462,800 A * | 10/1995 | Yamazaki | C23C 16/0272 423/213.5 |
| 5,853,653 A | 12/1998 | Donato et al. | |
| 6,162,543 A * | 12/2000 | Dubots | C04B 35/573 428/306.6 |
| 6,355,206 B1 * | 3/2002 | Hanzawa | C04B 35/573 266/239 |
| 6,558,595 B1 * | 5/2003 | Lotz | C04B 26/10 264/122 |
| 6,627,019 B2 | 9/2003 | Jarmon et al. | |
| 8,475,557 B2 | 7/2013 | Boger et al. | |
| 2005/0118392 A1 | 6/2005 | Millard et al. | |
| 2006/0283014 A1 | 12/2006 | Subramanian et al. | |
| 2013/0105386 A1 | 5/2013 | Deville et al. | |
| 2013/0167374 A1 | 7/2013 | Kirby et al. | |
| 2014/0072736 A1 | 3/2014 | Gray et al. | |

\* cited by examiner

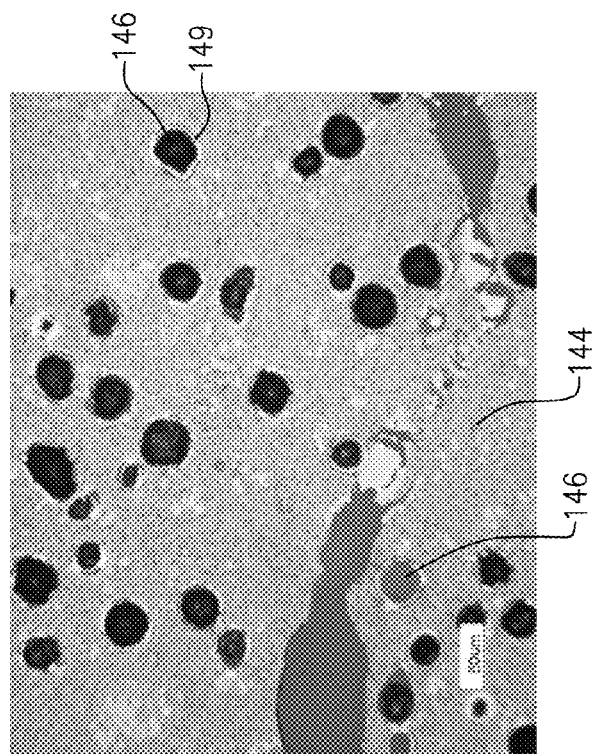
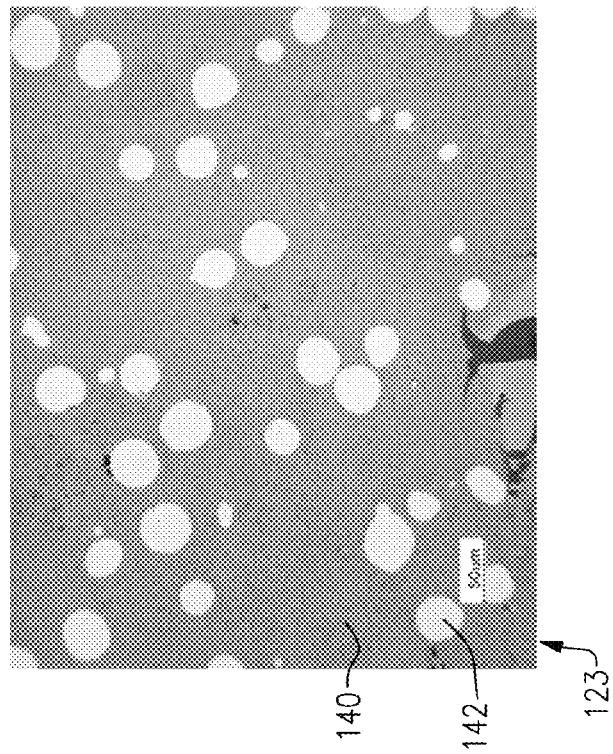
FIG. 4B
FIG. 4A

FORMATION OF VOIDS WITHIN COMPONENTS FORMED FROM POROUS SUBSTRATES

CROSS-REFERENCE TO RELATED APPLICATION

This application claims priority to U.S. Provisional Patent Application No. 61/976,521, filed Apr. 8, 2014.

BACKGROUND OF THE INVENTION

This application relates to a way of forming voids, such as cavities or hollows, or cooling channels, into a substrate material, such as a ceramic matrix composite ("CMC").

Components are being manufactured from more sophisticated materials. One such material includes CMC materials. Such materials have very beneficial characteristics when facing certain operational situations.

As one example, CMC components are very resistant to heat and, thus, have many applications in high temperature environments. They are being utilized in any number of high temperature locations in gas turbine engines, as an example. However, some applications would benefit from the provision of voids within the CMC body for various reasons. One reason may be the provision of cooling air through channels.

However, the formation of hollows, channels or other voids within a CMC body has been challenging.

It has been proposed to dispose carbon strings within a substrate and then oxidize the carbon away, leaving a void. However, these are very large diameter voids.

SUMMARY OF THE INVENTION

In a featured embodiment, a method of creating a component comprises forming a substrate and depositing a template material within the substrate, such that there are a plurality of template members. The component is heated to a temperature above a melting point of the template material, such that the template material wicks into a porosity of the substrate and forms a component with voids. An average hydraulic diameter of the voids is less than 1 millimeter.

In another embodiment according to the previous embodiment, the template material is silicon.

In another embodiment according to any of the previous embodiments, the component is for use in a gas turbine engine.

In another embodiment according to any of the previous embodiments, the average hydraulic diameter of the voids is less than 100 microns.

In another embodiment according to any of the previous embodiments, the average hydraulic diameter is greater than or equal to about 10 and less than or equal to about 20 microns.

In another embodiment according to any of the previous embodiments, a shell of silicon is formed around the voids to insulate, at least in part, the matrix material.

In another embodiment according to any of the previous embodiments, the substrate material initially includes graphite and the template material is silicon, such that the matrix includes a silicon carbide material.

In another embodiment according to any of the previous embodiments, the substrate material initially includes a carbon rich polymer derived ceramic matrix and the template material is silicon, such that the component includes a silicon carbide matrix.

In another embodiment according to any of the previous embodiments, the substrate material is further provided with metallic particles, selected from the group of molybdenum, titanium, vanadium, chromium, cobalt, nickel, zirconium, niobium, hafnium, tantalum, tungsten, platinum, yttrium and boron, such that the component also includes corresponding metal silicide regions.

In another embodiment according to any of the previous embodiments, the voids are utilized to receive a material subsequent to the formation of the voids.

In another embodiment according to any of the previous embodiments, the voids are subsequently filled.

In another embodiment according to any of the previous embodiments, the template material is one of fibers, particles, thin films, or sheets.

In another featured embodiment, a component formed by a method comprises forming a substrate and depositing a template material within the substrate, such that there are a plurality of template members. The component is heated to a temperature above a melting point of the template material, such that the template material wicks into a porosity of the substrate and forms a component with voids. An average hydraulic diameter of the voids is less than 1 millimeter.

In another embodiment according to the previous embodiment, the template material is silicon.

In another embodiment according to any of the previous embodiments, the component is for use in a gas turbine engine.

In another embodiment according to any of the previous embodiments, the average hydraulic diameter of the voids is less than 100 microns.

In another embodiment according to any of the previous embodiments, the average hydraulic diameter is greater than or equal to about 10 and less than or equal to about 20 microns.

In another embodiment according to any of the previous embodiments, a shell of silicon is formed around the voids to insulate, at least in part, the matrix material.

In another embodiment according to any of the previous embodiments, the substrate material initially includes graphite and the template material is silicon, such that the matrix includes a silicon carbide material.

In another embodiment according to any of the previous embodiments, the substrate material initially includes a carbon rich polymer derived ceramic matrix and the template material is silicon, such that the component includes a silicon carbide matrix.

In another embodiment according to any of the previous embodiments, the substrate material is further provided with metallic particles, selected from the group of molybdenum, titanium, vanadium, chromium, cobalt, nickel, zirconium, niobium, hafnium, tantalum, tungsten, platinum, yttrium and boron, such that the component also includes corresponding metal silicide regions.

In another embodiment according to any of the previous embodiments, the voids are utilized to receive a material subsequent to the formation of the voids.

In another embodiment according to any of the previous embodiments, the voids are subsequently filled.

In another embodiment according to any of the previous embodiments, the template material is one of fibers, particles, thin films, or sheets.

In another featured embodiment, a component comprises a body formed of a matrix material and having a plurality of voids with an average hydraulic diameter of the voids being less than 1 millimeter.

In another embodiment according to the previous embodiment, the matrix includes a substrate material infiltrated by a silicon material, the silicon material wicking into the substrate material to form the voids at a high melt temperature.

In another embodiment according to any of the previous embodiments, the component is for use in a gas turbine engine.

In another embodiment according to any of the previous embodiments, the average hydraulic diameter of the voids is less than 100 microns.

In another embodiment according to any of the previous embodiments, the average hydraulic diameter is greater than or equal to about 10 and less than or equal to about 20 microns.

In another embodiment according to any of the previous embodiments, a shell of silicon is formed around the voids to insulate, at least in part, the matrix material.

In another embodiment according to any of the previous embodiments, the substrate material initially includes a graphite and the template material is silicon, such that the matrix includes a silicon carbide material.

In another embodiment according to any of the previous embodiments, the substrate material initially includes a carbon rich polymer derived ceramic matrix and the template material is silicon, such that the matrix is a silicon carbide matrix.

In another embodiment according to any of the previous embodiments, the substrate material is further provided with metallic particles, selected from the group of molybdenum, titanium, vanadium, chromium, cobalt, nickel, zirconium, niobium, hafnium, tantalum, tungsten, platinum, yttrium and boron, such that the component also includes corresponding metal silicide regions.

In another embodiment according to any of the previous embodiments, the voids are filled.

These and other features may be best understood from the following drawings and specification.

BRIEF DESCRIPTION OF THE DRAWINGS

FIG. 4A shows an initial step in another embodiment.
FIG. 4B shows the subsequent step.

DETAILED DESCRIPTION

Figure 1:
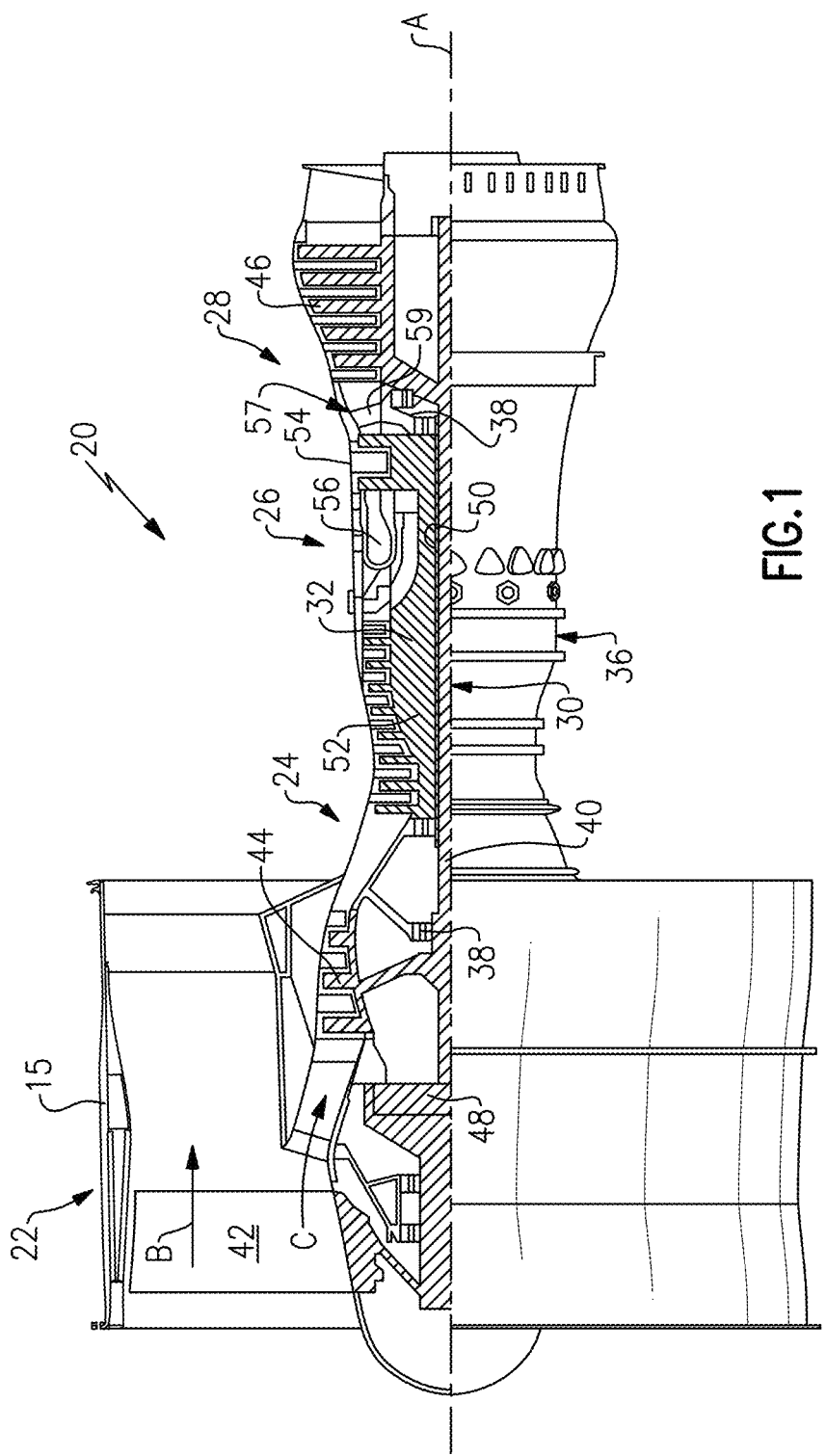
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
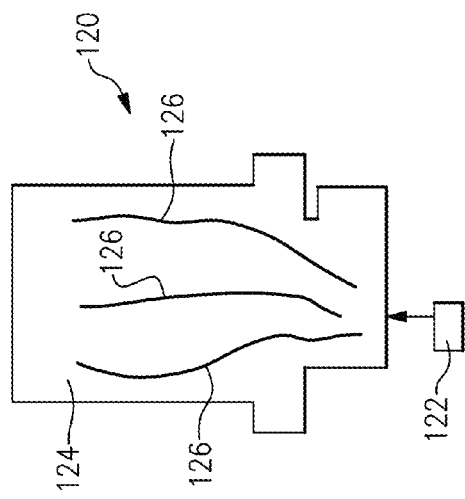
FIG. 2 shows a turbine blade which may incorporate the teachings of this disclosure.

FIG. 2 shows a component body 120, which may be a turbine blade as utilized in a gas turbine engine such as the engine in FIG. 1. Of course, other components such as heat panels, vanes, combustor liners, seals and the like may benefit from the teachings of this application.

As known, a source of air 122 provides cooling air into an airfoil 124 formed on the component 120. As shown schematically in FIG. 2, there are a plurality of very small voids, cavities or channels 126 extending through the component 120 and which may be formed by the teachings of this disclosure.

Figure 3A:
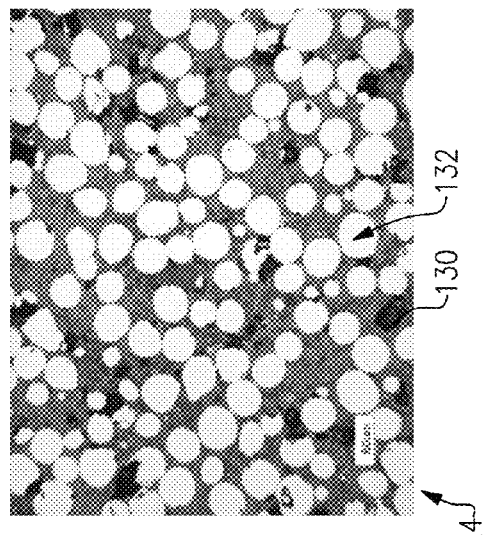
FIG. 3A shows an initial step according to the method of this disclosure.

FIG. 3A shows a first intermediate step to form the component 120. A carbon-containing substrate 130 is provided with silicon template materials 132. In non-limiting examples, the carbon-containing substrate can be graphite, amorphous carbon, glassy carbon, carbonaceous material, activated carbon, turbostratic carbon and mixtures thereof. The silicon particle may be of any form including fibers, whiskers, sheets, etc. and in very small sizes.

The matrix is then processed via typical processing. As an example, polymer infiltration and pyrolysis, slurry or tape casting, etc. may be performed to further process the matrix. This processing occurs at a temperature below the melting point of the silicon template material 132.

Figure 3B:
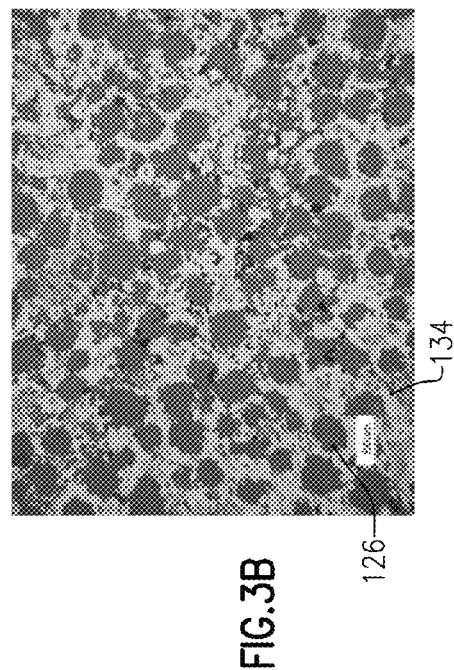
FIG. 3B shows a subsequent step.

After a prescribed state has been reached, as an example, an appropriate porosity level for substrate 130, the matrix is put through a melt infiltration step at a temperature of above the melting point of the template material 132. Thus, the template will melt and wick or infiltrate or otherwise relocate into the porosity of the substrate and leave a void space such as shown at 126 in FIG. 3B. Thus, the voids 126 become the cooling channels, in this example, while the matrix 134 provides the body of the component 120. Appropriate choice of substrate and template morphologies enables control of the geometries of voids 126. As an example, fibrous substrates and particulate templates can produce voids 126 with an elongated morphology.

This method is applicable to components formed by other materials, including other composites or monolithic structures or organic matrix composites. Notably, particular attention may be required with regard to the template materials for these alternative matrix materials.

This method, thus, forms cooling channels, hollow cavities, or other deliberately formed voids, which can be costly and difficult to produce by other methods within CMC materials. Challenges to incorporating these features from the beginning of CMC processing include design complexity due to the ceramic fiber architecture and compatibility issues with subsequent CMC matrix processing methods. As an example, many processes would fill in the desired voids or hollows.

Challenges with forming hollow features subsequent to CMC processing primarily include high cost and technical limitations of machining and may result in damage to the CMC matrix or fiber. As an example, loss of strength or environmental durability due to fabric or matrix damage can occur. Also, additional processing treatments can raise challenges with regard to maintaining the voids in the matrix.

This in situ process to form the voids overcomes traditional design barriers. In particular, the cost of this method is relatively low and the likelihood of damage is also reduced from the prior art.

Other benefits in particular with regard to CMC include facile incorporation of the invention with typical CMC materials.

Also, there may be remnant melt infiltration materials that are targeted. In the example component 123 shown in FIG. 4A, the substrate 140 is a carbon-rich polymer derived ceramic. The template is again silicon 142.

As shown in FIG. 4B, after the melt process, the matrix 144 remains with the silicon template now having infiltrated the porosity of the matrix 144, leaving voids 146. As shown, there may be a layer 149 of silicon around the void or opening 146. This can have additional environmental benefits as it isolates, or insulates, at least in part, the cooling air passing through the passage 146 from contacting the CMC material.

Figure 5A:
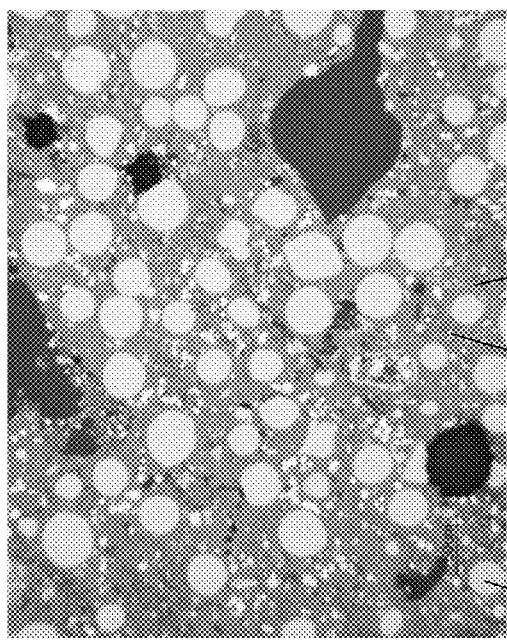
FIG. 5A shows yet another embodiment.
Figure 5B:
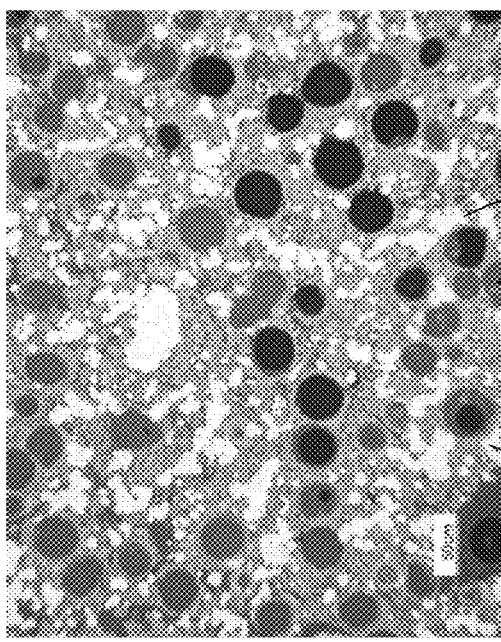
FIG. 5B shows a subsequent step.

FIG. 5A shows another embodiment 160 wherein there is a silicon template 162 and a substrate 164. After undergoing melting (see FIG. 5B), voids 168 remain within the matrix 166. The substrate 164 may again be a carbon-rich polymer derived ceramic material, however, in another example, relatively small molybdenum, or other metallic particles 161 may also be utilized. This can result in molybdenum disilicide, or other metal silicide, regions 170 in the final matrix 166 as shown in FIG. 5B, preferentially reducing or eliminating the original silicon template material. The silicon template material can be partially or wholly eliminated in the final form. The $MoSi_2$, or metal silicide, which is formed has a much higher melting point material than the original Si. While molybdenum is disclosed, metallic particles of other metals, including titanium, vanadium, chromium, cobalt, nickel, zirconium, niobium, hafnium, tantalum, tungsten, platinum, yttrium and boron may be utilized. All of these materials would result in a metal silicide region as mentioned above with regard to the molybdenum embodiment.

Figure 6:
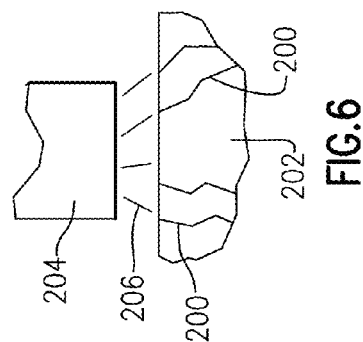
FIG. 6 shows another method embodiment.

FIG. 6 schematically shows a subsequent method step wherein a tool 204 is depositing infiltration material 206 into or onto a component 202 having voids 200 formed by the method of this disclosure. Thus, this method may be utilized to form such voids as an intermediate step such that the voids 200 better facilitate the depositing or infiltration of material 206 throughout the component 202. The voids may then be utilized for subsequent deposition or infiltration processes, to allow material to pass through the voids, and then into the matrix. In some of these methods, the voids can remain hollow after the subsequent process. Additionally, this method can be utilized not only to have voids in a final component, but may be utilized to form such voids as an intermediate step, the voids 202 then being filled by different materials for various known reasons.

In this invention, a diameter of the void is extremely small. As an example, they have an average hydraulic diameter of less than one millimeter. More narrowly, they have an average hydraulic diameter of less than 100 microns and, more narrowly, less than 50 microns. Typical average hydraulic diameters may be greater than or equal to about ten and less than or equal to about 20 microns in scale.

While CMC materials are disclosed, the teachings would extend to other ceramic, metal and composite systems. The teachings are also broadly applicable to hybrid CMC processing methods including polymer infiltration and pyrolysis, chemical vapor infiltration, melt infiltration, and glass transfer molding as examples. The method, the component formed by the method, and the component itself are all claimed here.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A component formed by a method comprising:
   forming a substrate and depositing a template material within said substrate, such that there are a plurality of template members; and
   heating said component to a temperature above a melting point of said template material, such that said template material wicks into a porosity of said substrate and forms a component with voids, wherein an average hydraulic diameter of said voids is less than 1 millimeter;
   wherein a shell of silicon is formed around said voids to insulate, at least in part, the matrix material.

2. The component as set forth in claim 1, wherein said template material is silicon.

3. The component as set forth in claim 1, wherein said component is for use in a gas turbine engine.

4. The component as set forth in claim 1, wherein the average hydraulic diameter of said voids is less than 100 microns.

5. The component as set forth in claim 4, wherein said average hydraulic diameter is greater than or equal to about 10 and less than or equal to about 20 microns.

6. The component as set forth in claim 1, wherein said substrate material initially includes graphite and said template material is silicon, such that said matrix includes a silicon carbide material.

7. The component as set forth in claim 1, wherein said voids are utilized to receive a material subsequent to the formation of the voids.

8. The component as set forth in claim 7, wherein said voids are subsequently filled.

9. The component as set forth in claim 1, wherein said template material is one of fibers, particles, thin films, or sheets.

10. A component comprising:
    a body formed of a matrix material and having a plurality of voids with an average hydraulic diameter of said voids being less than 1 millimeter, wherein said matrix includes a substrate material infiltrated by a silicon template material, said substrate material is further provided with metallic particles selected from a group of molybdenum, titanium, vanadium, chromium, cobalt, nickel, zirconium, niobium, hafnium, tantalum, tungsten, platinum, yttrium and boron, and said component includes a metal silicide reaction product of said metallic particles and said silicon template material.

11. The component as set forth in claim 10, wherein said silicon template material wicks into the substrate material to form the voids at a high melt temperature.

12. The component as set forth in claim 11, wherein said component is for use in a gas turbine engine.

13. The component as set forth in claim 11, wherein the average hydraulic diameter of said voids is less than 100 microns.

14. The component as set forth in claim 13, wherein said average hydraulic diameter is greater than or equal to about 10 and less than or equal to about 20 microns.

15. The component as set forth in claim 11, wherein a shell of silicon is formed around said voids to insulate, at least in part, the matrix material.

16. The component as set forth in claim 11, wherein said substrate material initially includes a graphite, such that said matrix includes a silicon carbide material.

17. The component as set forth in claim 11, wherein said substrate material initially includes a carbon rich polymer derived ceramic matrix, such that said matrix is a silicon carbide matrix.

18. The component as set forth in claim 10, wherein said reaction product comprises metal silicide regions corresponding to the metallic particles.

19. The component as set forth in claim 10, wherein said voids are filled.

20. A component formed by a method comprising:
    forming a substrate and depositing a template material within said substrate, such that there are a plurality of template members; and
    heating said component to a temperature above a melting point of said template material, such that said template material wicks into a porosity of said substrate and forms a component with voids, wherein an average hydraulic diameter of said voids is less than 1 millimeter;
    wherein said substrate material initially includes a carbon rich polymer derived ceramic matrix and said template material is silicon, such that said component includes a silicon carbide matrix, and wherein said substrate material is further provided with metallic particles, selected from the group of molybdenum, titanium, vanadium, chromium, cobalt, nickel, zirconium, niobium, hafnium, tantalum, tungsten, platinum, yttrium and boron, such that said component also includes corresponding metal silicide regions.

* * * * *

UNITED STATES PATENT AND TRADEMARK OFFICE
CERTIFICATE OF CORRECTION

PATENT NO. : 9,624,138 B2  
APPLICATION NO. : 14/639251  
DATED : April 18, 2017  
INVENTOR(S) : Paul Sheedy and Wayde R. Schmidt Page 1 of 1

It is certified that error appears in the above-identified patent and that said Letters Patent is hereby corrected as shown below:

In the Claims

In Claim 1, Column 7, Line 37; after "at least in part," replace "the matrix material." with --a matrix.--

In Claim 6, Column 7, Line 49; before "initially includes graphite" delete "material"

In Claim 10, Column 8, Line 4; after "1 millimeter," replace "wherein said matrix" with --wherein said matrix material--

In Claim 20, Column 8, Line 49; before "initially includes a carbon" delete "material"

Signed and Sealed this  
Twenty-eighth Day of May, 2019

Andrei Iancu  
*Director of the United States Patent and Trademark Office*